(12) United States Patent
Stanislawski et al.

(10) Patent No.: US 10,746,275 B2
(45) Date of Patent: Aug. 18, 2020

(54) ACTUATOR, ESPECIALLY FOR USE IN A MOTOR VEHICLE

(71) Applicant: OECHSLER AG, Ansbach (DE)

(72) Inventors: Peter Stanislawski, Ansbach (DE); Stefan Dettenberger, Ansbach (DE)

(73) Assignee: OECHSLER AG, Ansbach (DE)

( * ) Notice: Subject to any disclaimer, the term of this patent is extended or adjusted under 35 U.S.C. 154(b) by 0 days.

(21) Appl. No.: 16/421,602

(22) Filed: May 24, 2019

(65) Prior Publication Data

US 2019/0360575 A1  Nov. 28, 2019

(30) Foreign Application Priority Data

May 26, 2018  (DE) .................. 10 2018 004 260

(51) Int. Cl.
| | |
|---|---|
| *F16H 55/24* | (2006.01) |
| *F16H 57/039* | (2012.01) |
| *F16H 1/16* | (2006.01) |
| *F16H 57/022* | (2012.01) |
| *F16H 57/12* | (2006.01) |

(Continued)

(52) U.S. Cl.
CPC ............... *F16H 55/24* (2013.01); *F16H 1/16* (2013.01); *F16H 57/022* (2013.01); *F16H 57/039* (2013.01); *F16H 57/12* (2013.01); *F16H 2057/0213* (2013.01); *F16H 2057/02021* (2013.01); *F16H 2057/0221* (2013.01); *F16H 2057/02082* (2013.01); *F16H 2057/127* (2013.01)

(58) Field of Classification Search
CPC .......... F16H 57/039; F16H 2057/0213; F16H 2057/0221; F16H 2057/127; F16H 55/24
See application file for complete search history.

(56) References Cited

U.S. PATENT DOCUMENTS

| | | | |
|---|---|---|---|
| 4,040,307 A | 8/1977 | Koster | |
| 6,930,416 B1 * | 8/2005 | Remington | ............ H02K 1/185 310/216.113 |

(Continued)

FOREIGN PATENT DOCUMENTS

| | | |
|---|---|---|
| CH | 113 791 A | 2/1926 |
| DE | 26 19 989 A1 | 11/1976 |
| DE | 199 42 252 A1 | 11/2000 |

(Continued)

OTHER PUBLICATIONS

Translation of German Patent Publication 19942252 to Weber. (Year: 2000).*

*Primary Examiner* — Randell J Krug

(74) *Attorney, Agent, or Firm* — Collard & Roe, P.C.

(57) ABSTRACT

In an actuator, which can be used, for example, for an electromotive parking brake, and the housing of which is equipped with a gear mechanism, axial and radial bracings of a worm member take place using a bearing bracket, the limbs of which, on both sides, engage the worm member from behind and reach radially beyond its shaft. As seizing protection against a wedging between the worm member and the worm wheel, the bearing bracket can be slightly displaced in the housing. For this purpose, by virtue of the restoring forces exerted by the spring elements, which are then tensioned, the bearing bracket together with the worm member is pushed axially and the worm wheel 20 is turned.

9 Claims, 2 Drawing Sheets

(51) Int. Cl.
*F16H 57/02* (2012.01)
*F16H 57/021* (2012.01)

(56) References Cited

U.S. PATENT DOCUMENTS

2015/0219271 A1* 8/2015 Kori .................. F16M 11/18
   74/409
2018/0259059 A1* 9/2018 Nakamura .......... F16H 57/0498

FOREIGN PATENT DOCUMENTS

| DE | 19942252 A1 | * | 11/2000 | ........... B62D 5/0409 |
| DE | 10 2015 226 770 A1 | | 6/2017 | |
| GB | 2327652 A | * | 2/1999 | ........... B62D 5/0409 |

* cited by examiner

ACTUATOR, ESPECIALLY FOR USE IN A MOTOR VEHICLE

CROSS REFERENCE TO RELATED APPLICATIONS

Applicant claims priority under 35 U.S.C. § 119 of German Application No. 10 2018 004 260.0 filed May 26, 2018, the disclosure of which is incorporated by reference.

BACKGROUND OF THE INVENTION

1. Field of the Invention

The invention relates to an actuator having a housing, which is equipped with a motor, and having a gear mechanism driven by it, which is provided with a worm member that engages in a worm wheel and is coaxial with the motor and is also borne in a manner remote from the motor.

2. Description of the Related Art

Such actuators, equipped with low-voltage gear motors, find use in diverse ways, for example in motor vehicles, for comfort drives such as for movement of belt buckles, windows or sliding roofs, for adjustment of seats and especially for application and release of parking brakes. Such actuators, operated on the on-board power system, may be activated manually via switches or directly from the vehicle's own electronic data-processing system.

Such an actuator is typically equipped with a small high-speed electromechanically or electronically commutated direct-current motor having downstream spur-gear mechanisms capable of stepping down in several stages, in order not only to reduce the noise generation attributable above all to high-speed components but in particular also to provide the output shaft with a torque adequate for the respective work effort.

In the class-defining DE 10 2015 226 770 A1, the motor drives not a spur-gear mechanism but instead a worm-gear mechanism, the worm member of which is fastened with a coaxial blind hole onto the protruding axial end of the motor shaft using substance-to-substance bonding. The worm member is engaged inside the actuator housing with a worm wheel, which drives the output shaft of the actuator. This construction suffers from the problem of torque transmission from the worm member to the worm wheel, because it may lead to an axial load of the worm member and thus of the motor shaft that is critical to operation. For the use of inexpensive mass-produced motors, no feasible way exists of absorbing this axial load on a motor plate. A bearing system for absorption of the axial load at the end of the worm member remote from the motor needs considerable installation space in the actuator housing in addition to the radial bearing system to be ensured here for the worm wheel in the actuator housing.

SUMMARY OF THE INVENTION

In awareness of such circumstances, the present invention is based on the technical problem of creating, for the worm member, a bearing system that is simple to fabricate and assemble, that is durably active and that also supports additional functions during operation of the worm-gear unit as well as possible.

These and other objects are accomplished by an actuator having the cooperation of the important features according to the invention. According to this actuator, a U-shaped bearing bracket is provided, which is equipped with angled limbs, and the yoke of which, centrifugally offset, extends along the worm member, and which, with its limbs oriented transversely relative thereto, i.e. in radially centripetal manner relative to the worm axis, axially engages with the worm member from behind in the respective region of its two end faces. Insofar as the bearing bracket is assembled in a manner fixed to the housing, an axial bearing system in the two axial directions opposite to one another results from this for the shaft equipped with the worm member.

Within the scope of the present invention, the bearing bracket, which is preferably formed from stiffly elastic material such as spring sheet metal, does not have to be folded in one-piece U-shaped manner, but it may also be grouped together as the bearing bracket from two angle pieces folded in L-shaped manner that are held parallel to the worm axis in a manner offset from one another.

Preferably at least one of the bearing-bracket limbs is equipped with a slit hole, which is oriented and opened transversely relative to its longitudinal extent, and the length of which extends over at least the half width of the limb. The slit hole can be pushed centripetally, in front of the adjacent end face of the worm member, onto the shaft, which thereby is radially borne over the half of its circumference in steel-on-steel manner in the bearing bracket. Thereby a wear-prone radial bearing system of the steel shaft is unburdened between two plastic half shells fixed to the housing and thus the reliable function of the steel member rotating in plastic is prolonged.

The worm member does not have to be assembled by substance-to-substance bond on or in front of a motor shaft, which thereby becomes the worm shaft at the same time; any other coupling is likewise conceivable in principle, such as a pressing of an axial bore in the worm member onto a knurled axial region of the motor shaft protruding from the motor housing: up to a worm-thread manifestation directly in the shell surface of a motor shaft protruding in elongated manner.

The worm shaft does not have to be axially aligned with the surface, remote from the motor, of the end face of the worm member; it may also extend axially beyond the end face, in order, for example with an axial end rounded in spherical-cap shape, to yield a definedly small-area contact against an axial bearing in the form of a bearing-bracket limb. This arrangement corresponds to what is an indirect axial bearing system of the worm member here, in contrast to the direct axial bearing system, considered in the foregoing, of the limb bearing axially against the end face there.

When sufficiently long, radially oriented limbs extend meanderingly along the worm axis as a consequence of multiple folding, this arrangement increases a certain elasticity in the axial bracing of the worm member. Above all, however, the mounts of the shaft in the slit holes are unburdened, because the multiple mounts, respectively offset axially relative to one another, reduce the surface pressure on the respective radial mount.

For assembly in the actuator housing, the bearing bracket is fastened, frictionally or interlockingly, for example, to a one-piece or multi-piece fixation member or else between this fixation member and a parting joint of the housing. In principle, the bearing bracket is thereby held rigidly on the housing. Preferably, however, a slight axial movement of the fixation member and thus of the bearing bracket relative to the housing is permitted; namely under direction-of-rotation-dependent axial bracing of the fixation member against spring elements such as resiliently elastic cushion-like members, which in turn are then braced rigidly in the housing. Thereby it can be ensured that in the toothed engagement between worm member and worm wheel, these components do not become wedged with one another (so-called vise effect) upon attainment of the linear end stop of the bearing bracket, because, with the end of introduction of torque into the worm wheel, the axial contact pressure of the worm member against the toothing of the worm wheel becomes somewhat reduced right away by the spring elements, via the axial bearing system of the worm member by means of the bearing bracket.

Such prevention of blocking is promoted not only by the mentioned spring elements and by resiliently elastic limbs of the bearing bracket, but also by production-related axial play of the motor shaft equipped with the rotor. An increase of this blocking protection is further possible in that the motor mount in the actuator housing permits a slight axial play of the motor itself.

Moreover, a seizing protection for the worm wheel may be provided in that a lever, for example, is pivoted concentrically relative to the worm wheel against one of two spring elements fixed relative to the housing, and by which it is turned minimally backward again into a load-free position.

BRIEF DESCRIPTION OF THE DRAWINGS

Additional further developments and their alternatives will become evident from the claims and also, with consideration of their advantages, from the following description of preferred exemplary embodiments of the accomplishment according to the invention.

In the sketches according to the drawing, reduced to what is functionally essential.

DETAILED DESCRIPTION OF PREFERRED EMBODIMENTS

Figure 1:
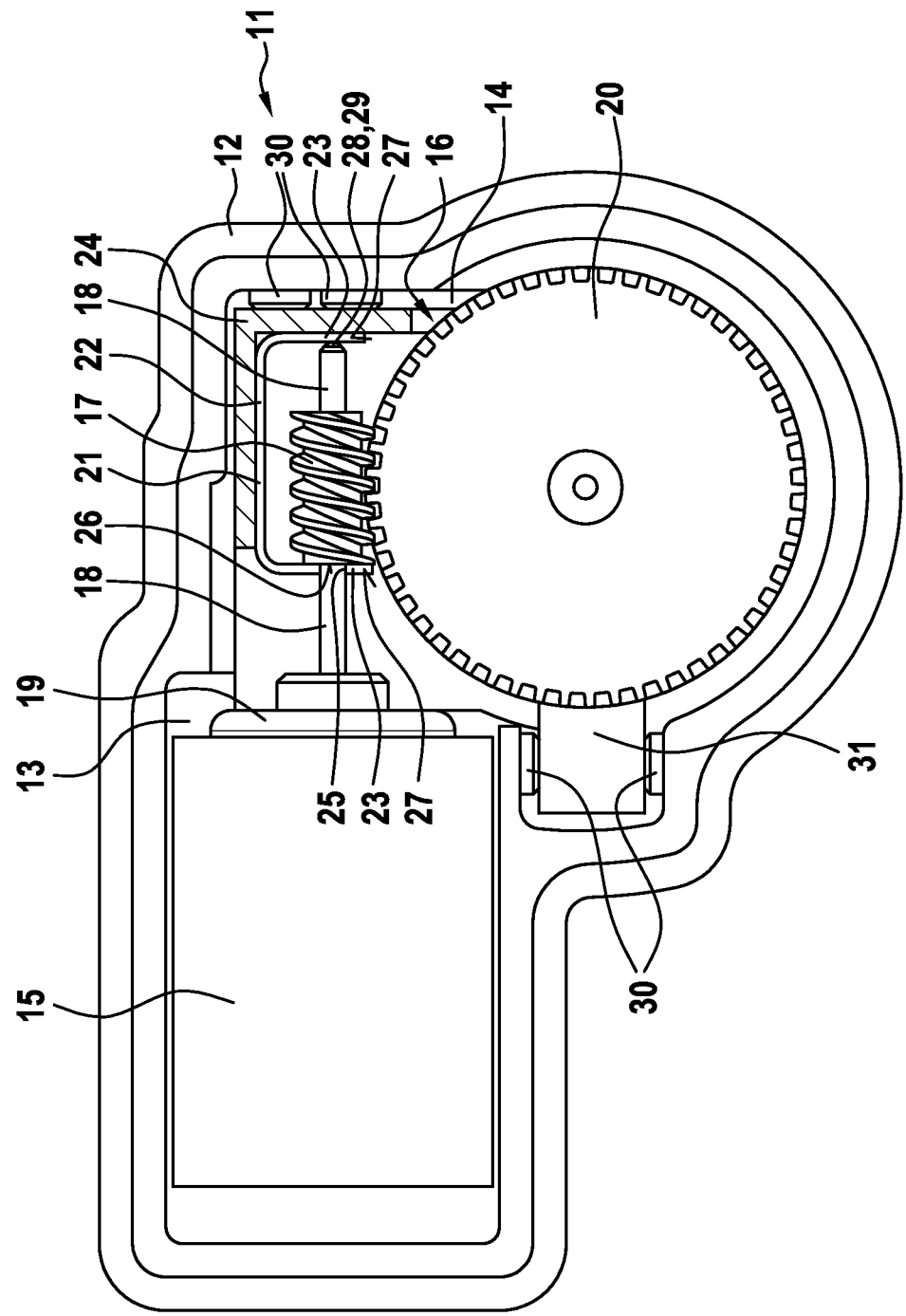
FIG. 1 shows an actuator designed according to the invention with bearing bracket in axial-longitudinal section, approximately true-to-scale.

The actuator 11 sketched by way of example is provided with a split housing 12 having a motor mount 13 and a gear-mechanism mount 14, the motor mount 13 accommodating a high-speed actuator motor 15, and the actuator 11 having as the first gear stage a step-down worm-gear mechanism 16 behind motor 15 and accommodated by the gear-mechanism mount 14. Worm member 17 of this first gear stage is formed on the shaft 18 protruding coaxially from the motor 15 or in any case is fastened to rotate therewith. The shaft 18 is borne radially in the motor plate 19 and in front of it in plastic half shells (not shown).

As the first gear stage for the increase of the torque in response to reduction of the revolutions per minute (rpm), the motor-driven worm member 17 engages in the outer toothing of a worm wheel 20 of gear mechanism 15. This worm wheel is designed as a shallow pot-shaped hollow wheel with circumferential inner toothing (not illustrated in the drawing), with which the planet wheels of a planetary gear mechanism mesh as the second gear stage. Thereby the planet web is turned, which is equipped concentrically in torsionally stiff manner with an output shaft.

The axial load of the shaft 18 occurring in direction-of-rotation-dependent manner during torque transmission from the worm member 17 to the worm wheel 20 is absorbed by a bearing bracket 21 for worm member 17. Bearing bracket 21, in principle is fixed to the housing, and made of stiffly elastic material such as spring sheet metal. For this purpose, the bearing bracket 21 is formed in the manner of a U, but with relatively elongated U-shaped yoke 22 parallel to the shaft 18 and centrifugally offset along the worm member 17. At its two ends, the yoke 22 is respectively folded at right angles to limbs 23 of bearing bracket 21. Thereby, after the bearing bracket 21 has been slipped centripetally onto the shaft 18, limbs 23 are oriented radially relative to the shaft 18. The bearing bracket 21 is fastened on a fixation member 24 in housing 12. Fixation member 24 is made, for example, of an injection-molded plastic, and in turn is borne in the region of the gear-mechanism mount 14 in the actuator housing 12.

What is not illustrated is that the yoke 22 of the axial bearing bracket 21 may also be split. Then two L-shaped parts, which add up to a bearing bracket, are held on the fixation member 24 in a manner axially offset from one another.

In any case, the motor-side part of the limb 23 has, for the said centripetal slipping of the bearing bracket 21 onto the shaft 18, a slit hole 25, which extends and is opened transversely relative to the longitudinal extent of the limb 23. With this opening, the limb 23 reaches radially beyond the shaft 18, whereas it engages the end face 26 of the worm member 17 turned toward the motor 15 axially from behind. This arrangement results in a certain radial bearing system for the shaft 18 in the horseshoe profile of the slit hole 25, wherein the shaft 18 is otherwise (not shown) borne in the housing 12 between two radial half shells of plastic. Above all, a non-folded axial bracing of the worm member 17 is established, because the limb 23 extends not only centripetally up to the shaft 18 but also beyond the shaft to span the entire diameter of the end face 26 of the worm member 17 in diametral manner.

Axially opposite this portion, the motor-remote part of the limb 23 may also be designed, by such a slit hole or horseshoe hole 25, to be pushed centripetally onto the shaft 18 by engagement of the worm member 17 from behind at the end face. In order to reduce the frictional losses at this axial bracing, however, it may be more expedient, as sketched, to undertake the axial bracing, in a manner remote from the motor, of the shaft 18 protruding concentrically from the worm member 17, not via the worm member 17 but instead at its free axial end 28. In the interests of the most punctiform contact possible of the local limb 23 close to its front 27, the axial end 28 of the shaft 18 is expediently rounded approximately as a spherical cap 29.

The fixation member 24, on which the one-piece or multi-piece bearing bracket 21 is fastened, is preferably not fixed rigidly in the housing 12, but instead, with the worm-equipped shaft 18, which is thereby braced against the worm wheel 20, can be displaced slightly in the one or the other axial direction, depending on the instantaneous direction of rotation. Thereby, during travel into an end position, spring elements 30 disposed there are compressed. These spring elements are, for example, compliantly elastic cushions or similar compliant components, which project from the body of fixation member 24 in a manner parallel to the axis and which are disposed between the fixation member 24 and the axially adjacent region of the housing 12. From the resiliently elastic return-movement effect, not only does an assembly tolerance compensation result but, in particular, so also does a seizing protection against wedging of the worm thread in the worm wheel 20 upon arrival of the worm wheel 20 against an end stop.

For this purpose, the worm member 17 may be displaced relative to the shaft 18 on which it is mounted to rotate therewith. Alternatively, if worm member 17 is rigid on the shaft 18, it may be pushed axially together with the shaft 18.

If, due to the construction, the axial play of the rotor in the motor 15 were not to be sufficient for the return movement of the shaft 18, initiated in resiliently elastic manner, to prevent travel into a seizing position, even the motor 15 itself may be borne in its mount 13 in a manner that is minimally but nevertheless still sufficiently displaceable axially.

In the drawing, it is considered that it is expedient to oppose a wedging of the worm engagement at the end stop not only with respect to the linear movement of the worm member 17, but also with respect to the rotational movement of the worm wheel 20. For this purpose, a pivot lever 31 that can be turned concentrically relative to the worm wheel 20 as a function of the direction of rotation of the worm wheel 20 engages compressingly between two further spring elements 30, in order to turn the worm wheel 20 backward slightly for unburdening. For this purpose, a frictional connection may be formed between the pivot lever 31 and the worm wheel 20. From the viewpoint of the efficiency of the gear mechanism, however, it is more expedient to derive the pivoting of the lever 31 from a movement component of the fixation member 24; in the schematic sketch of the drawing, this arrangement is taken into consideration in that the fixation member 24 and the pivot lever 31 engage with the worm wheel 20 from behind.

Figure 2:
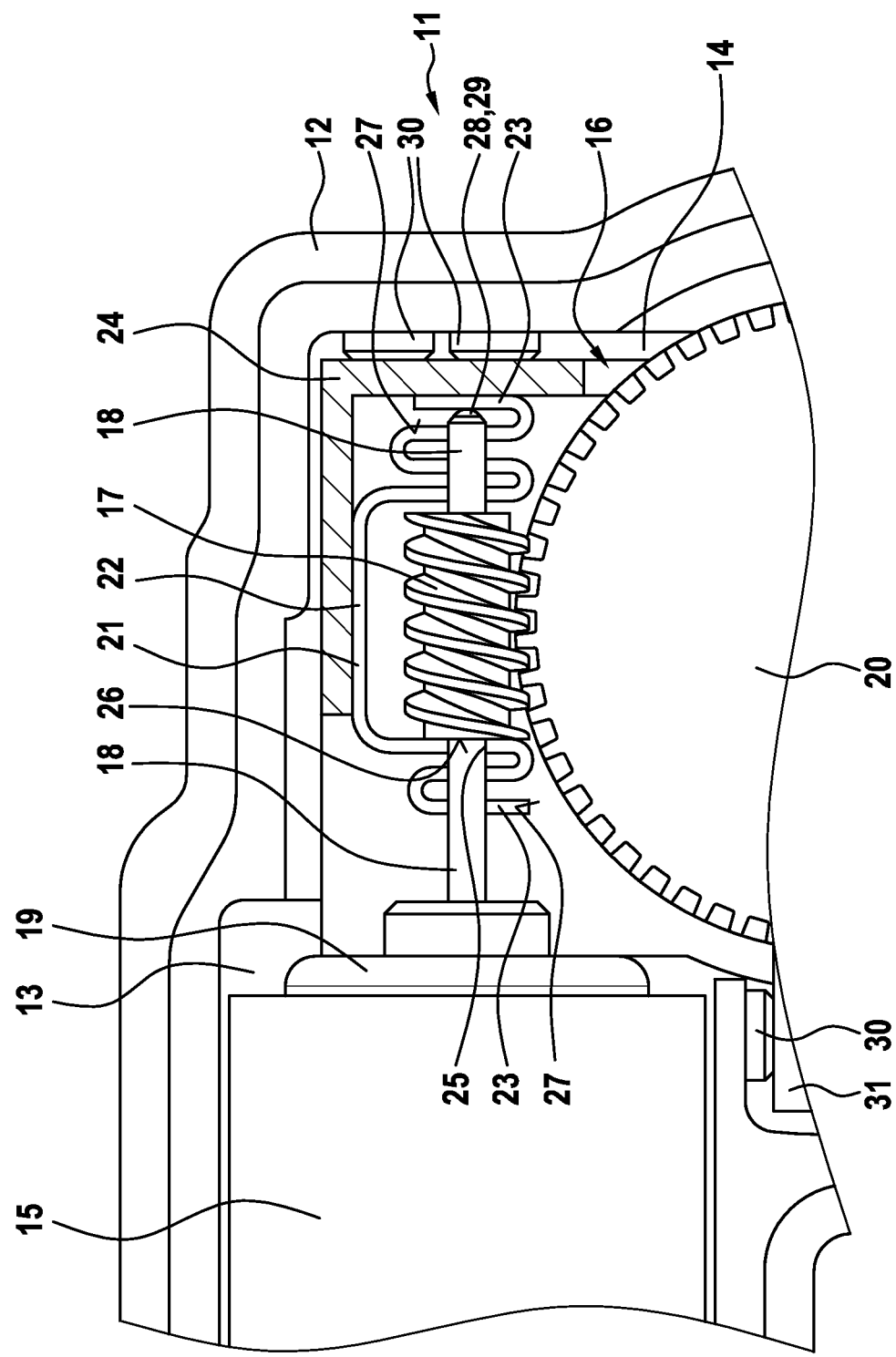
FIG. 2 shows a detail of FIG. 1 with further developed bearing bracket.

As explained in more detail in the foregoing with reference to FIG. 1 of the drawing, the limbs 23 of the bearing bracket 21 provide the axial bracing, oppositely directed on the two sides, of the worm member 17 and thus of the shaft 18 joined to it in torsionally stiff manner. In addition, however, the effect of a radial bearing system occurs transversely relative to the orientation of the slit hole 25 in the respective limb 23. This radial bearing system can be multiplied by repetition along the shaft 18, in that the bearing bracket 21 is equipped at one end at least with several of such limbs 23, which are offset axially relative to one another and which lead to correspondingly many radial bearing systems axially offset relative to one another. For this purpose, as is evident from FIG. 2, long limbs 23 may be folded multiple times into a meandering course having axially aligned slit holes 25. A critical surface pressure between the rim of the slit hole 25 and the shaft 18 braced against it is now prevented in that the total load is distributed over a multiplicity of such radial bracing points, which are relatively closely adjacent to one another.

At the axial end 28 of the shaft remote from the motor, where the axial bearing system of the worm member 17 acts indirectly via the shaft 18, the last folding limb 23 is not perforated, in order to allow the shaft 18 to bear axially here with the spherical cap 29 at its end face.

All of these axial and radial bearing points are mounted in a train, in that the bearing bracket 21 fastened on the fixation member 24 is pushed, together with the slit holes 25, centripetally onto the shaft 18, in a manner reaching axially beyond the worm member 17.

In an actuator 11, which can be used, for example, for an electromotive parking brake, and the housing 12 of which is equipped along a shaft 18 with a motor 15 and a worm gear mechanism 16, a bracing of the worm member 17 therefore takes place according to the invention by means of a bearing bracket 21, which is fixed on a fixation body or member 24 that can be slightly displaced axially. The relatively long U-shaped yoke 22 of the bearing bracket 21 extends parallel to the axis along the screw or worm member 17, whereas its limbs 23 on both sides axially engage the worm member 17 directly or indirectly at the end face. These limbs 23 reach beyond the shaft 18 with centripetally oriented slit holes 25.

As seizing protection against a wedging between the worm member 17 and the worm wheel 20 upon attainment of an end stop of the worm wheel 20, the fixation member 24, which is braced against spring elements 30, can be slightly displaced axially in the housing 12, in order to unburden the worm engagement, which is being subjected to the load of the torque transmission. For this purpose, by virtue of the restoring forces exerted by the spring elements 30, which have respectively just been tensioned, the fixation member 24 together with axial bearing bracket 21 and worm member 17 is pushed slightly axially relative to the shaft 18 or together with the shaft 18 or else with the motor 15, against the load action. Expediently, the worm wheel 20 is also turned back slightly in resiliently elastic manner from its end-stop position.

Although only a few embodiments of the present invention have been shown and described, it is to be understood that many changes and modifications may be made thereunto without departing from the spirit and scope of the invention.

What is claimed is:

1. An actuator comprising:
   (a) a housing;
   (b) a motor in the housing;
   (c) a shaft connected to the motor;
   (d) a gear mechanism driven by the motor and comprising a worm wheel and a worm member coaxial with the motor engaging in the worm wheel remote from the motor; and
   (e) a bearing bracket held in the housing comprising a U-shaped yoke extending along the worm member;
   wherein the worm member has a first end face and a second end face opposite the first end face;
   wherein the U-shaped yoke comprises first and second limbs extending radially relative to the shaft and over the first and second end faces of the worm member, respectively, so that the first and second limbs embrace or encompass the worm member and are in direct contact or indirectly coupled with the first and second end faces, respectively, to support the worm member in an axial direction; and
   wherein the first limb has a motor-remote part bearing axially at the first end face against a hemispherical axial end of the shaft.

2. The actuator according to claim 1, wherein at least the first limb bears axially against the worm member at the first end face and extends radially beyond the shaft, the first limb comprising a slit hole, the slit hole being opened transversely relative to a longitudinal extent of the first limb.

3. The actuator according to claim 1, wherein at least the first limb extends meanderingly, in a manner folded over a length of the first limb.

4. The actuator according to claim 1, wherein the bearing bracket is axially displaceable together with the shaft.

5. The actuator according to claim 1, wherein the bearing bracket is fastened to a fixation member disposed in the housing.

6. The actuator according to claim 5, further comprising spring elements disposed between the fixation member and the housing.

7. The actuator according to claim 1, wherein the worm member is disposed in a torsionally rigid manner on the shaft and is axially displaceable together with the bearing bracket along the shaft.

8. The actuator according to claim 1, wherein the worm member is fastened rigidly on the shaft and on the bearing bracket and wherein the shaft, together with the worm member fastened rigidly on the shaft as well as the bearing bracket, is axially displaceable.

9. The actuator according to claim 1, wherein the motor is axially displaceable.

* * * * *